L. F. CONANT.
APPARATUS FOR RECLAIMING PRECIOUS METALS FROM ORES.
APPLICATION FILED MAR. 6, 1918.

1,318,134.

Patented Oct. 7, 1919
2 SHEETS—SHEET 1.

Inventor.
Louis F. Conant
by Heard Smith & Tennant
Attys.

L. F. CONANT.
APPARATUS FOR RECLAIMING PRECIOUS METALS FROM ORES.
APPLICATION FILED MAR. 6, 1918.

1,318,134.

Patented Oct. 7, 1919.
2 SHEETS—SHEET 2.

Inventor.
Louis F. Conant
by Heard Smith & Tennant.
Attys.

UNITED STATES PATENT OFFICE.

LOUIS F. CONANT, OF CAMBRIDGE, MASSACHUSETTS.

APPARATUS FOR RECLAIMING PRECIOUS METALS FROM ORES.

1,318,134. Specification of Letters Patent. Patented Oct. 7, 1919.

Application filed March 6, 1918. Serial No. 220,685.

*To all whom it may concern:*

Be it known that I, LOUIS F. CONANT, a citizen of the United States, residing at Cambridge, county of Middlesex, State of Massachusetts, have invented an Improvement in Apparatus for Reclaiming Precious Metals from Ores, of which the following description, in connection with the accompanying drawing, is a specification, like characters on the drawing representing like parts.

This invention relates to a method of and apparatus for reclaiming precious metal from ores and has for its objects to provide a novel method of reclaiming precious metal from ores by means of mercury or the amalgamation process, and also to provide a novel apparatus of the amalgamator type by which the process may be carried out.

My improved method consists in forcing positively the metal-bearing ore through a body of mercury. During the passage of the ore through the mercury, the latter acts on and amalgamates with the gold and silver in the ore, thus extracting said metals from the ore, the refuse or tailings being discharged from the body of mercury free from any precious metal. If the ore contains platinum, the latter will gravitate to the bottom of the amalgamating chamber which contains the mercury and will remain there unaffected by the passage of the ore through the chamber.

The process can be continuously carried out by forcing ore continuously through the body of mercury and allowing the refuse or tailings to be discharged after they have passed through the body of mercury. When the mercury has absorbed a desirable amount of gold or silver, then it may be withdrawn from the amalgamating chamber and distilled in usual manner thereby separating the precious metals therefrom.

To carry out the above process I propose to use an apparatus embodying an amalgamating chamber containing mercury and provided with an inlet opening through which the ore is forced into the chamber and also provided with a discharge opening through which the refuse or tailings is discharged from the chamber.

The amalmagating chamber is of such a shape and construction that any material which passes therethrough from the inlet opening to the outlet opening is obliged to pass through the body of mercury in the chamber. During the passage of the ore through the body of mercury all the gold and silver in the ore becomes amalgamated with the mercury and any heavy precious metal like platinum will settle at the bottom of the chamber. The amalgamating chamber is provided in its bottom with a valve through which the amalgam and any heavy precious metal, such as platinum, is removed at proper intervals.

My improved apparatus is constructed so that it will operate on ore in either a wet or a dry state and hence has the advantage that the device can be successfully used in those locations where there is a scarcity of water. Further, the apparatus is very simple in construction and easy to operate and has other advantages which will more fully hereinafter appear.

In order to give an understanding of my invention, I have illustrated in the drawings an apparatus showing a selected embodiment thereof which will now be described, after which the novel features will be pointed out in the appended claims.

Figure 1 of the drawings is a vertical sectional view of a device embodying my invention;

Figure 1:
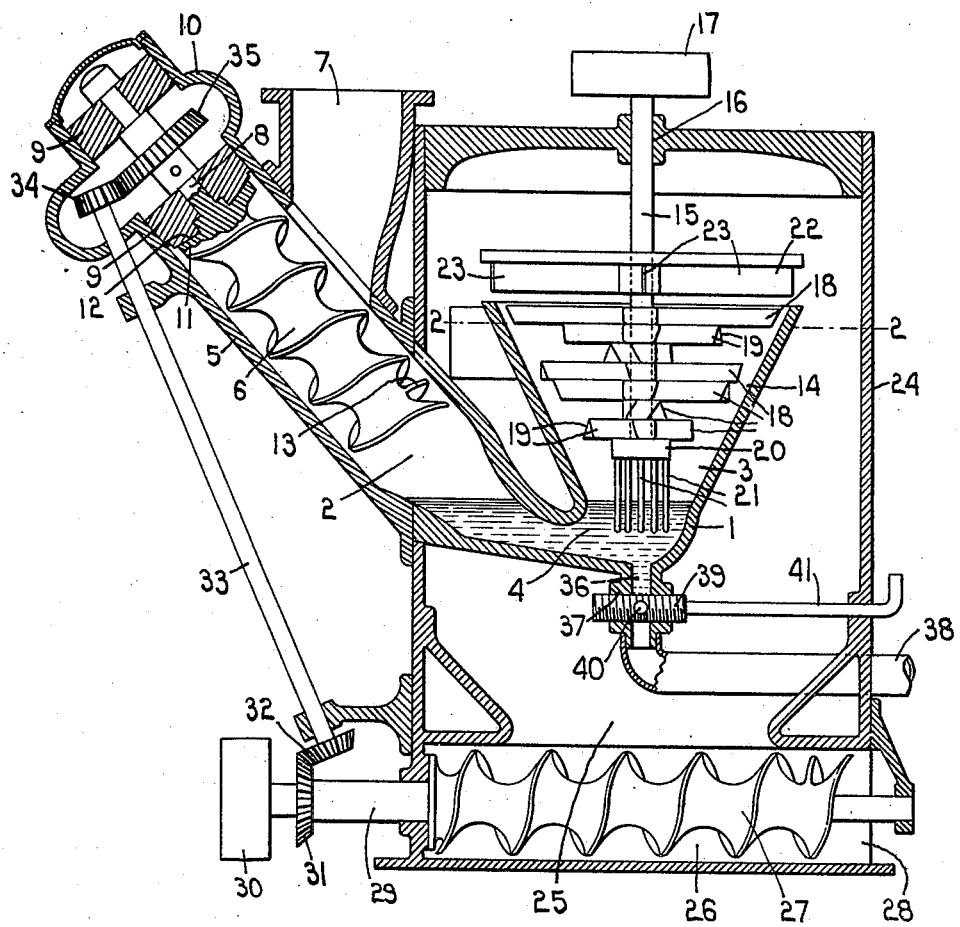
Figure 2:
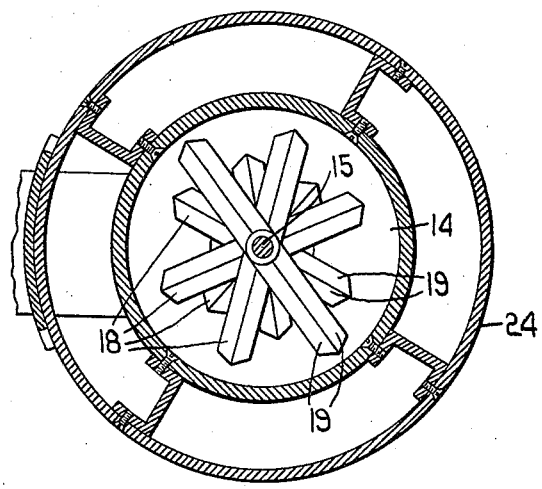
Fig. 2 is a section on the line 2—2 Fig. 1.
Figure 3:
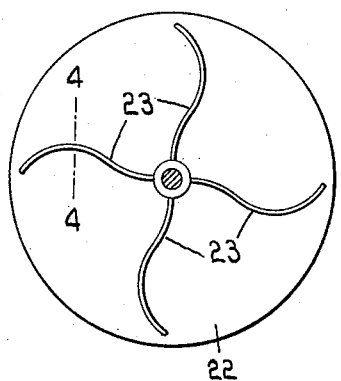
Fig. 3 is an underside view of the plate 22 employed in this device.
Figure 4:
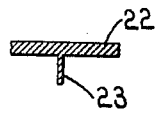
Fig. 4 is a section on the line 4—4, Fig. 3.
Figure 5:
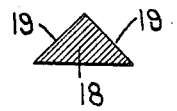
Fig. 5 is an enlarged transverse section through one of the lifting elements 18.

As stated above, my improved process consists in forcing the ore, whether in a wet or a dry state, through a body of mercury. This body of mercury will preferably be contained in an amalgamating chamber having an inlet through which the ore is forced into the chamber and having an outlet through which the tailings or refuse is discharged from the chamber.

In the apparatus shown, the amalgamating chamber is indicated at 1 and it is provided with the inlet opening 2 through which the ore is introduced into the chamber, and the discharge or outlet opening 3 through which the tailings and refuse is discharged from the chamber, said chamber containing a quantity of mercury 4.

The amalgamating chamber may have any shape suitable for the purpose, the only requirement being that it be so constructed that in passing from the inlet 2 to the outlet 3, all the ore must necessarily pass through the body of mercury 4 which is received within the chamber 1. I will, preferably, however, make the amalgamating chamber in the form of a U-shaped passage, one end of the passage constituting the inlet opening and the other the discharge opening, and a sufficient quantity of mercury will be used in the passage to completely fill the bend of the chamber so that the material which is passed through the chamber from the inlet opening to the outlet opening must necessarily pass through the mercury.

Any suitable means may be employed for forcing the metal bearing ore into the inlet opening 2 and through the chamber 1. In the construction herein illustrated the inlet 2 has a feed pipe or conduit 5 communicating therewith in which operates a screw conveyer 6. The conduit 5 is provided with a hopper or feed opening 7 through which the ore is introduced into the conduit, said ore being positively moved through the conduit into the inlet 2 by means of the screw conveyer 6. The conveyer 6 may be supported and operated by any suitable mechanism appropriate for the purpose. In order to provide a screw conveyer which will be most effective and which is arranged so as not to present any obstruction to the free passage of the ore, I propose to provide the upper end of the conveyer with a shaft section 8 which is rotatably mounted in two bearings 9 carried by a gear housing or suitable support 10. By using two separated bearings 9 the conveyer is rigidly supported and will be held in proper position without the use of any bearing at the delivery end of the conveyer that would tend to interfere with the free movement of the ore. The shaft 8 of the conveyer is provided with a disk member 11 having a concave face which rests against a correspondingly-shaped face 12 of one of the bearings. This provides a suitable packing which prevents the ore from getting into or injuring the bearing.

If desired the screw conveyer 6 may have an additional blade 13 near its delivery end which is effective in positively forcing the ore through the opening 2.

The means for driving the conveyer will be hereinafter referred to.

The discharge opening 3 of the amalgamating chamber 1 communicates with an open-topped chamber 14 which has a gradually-increasing cross-sectional area from the discharge opening 3 of the amalgamating chamber to the open top. Situated in this chamber 4 are a plurality of agitating and lifting elements which operate to keep the ore agitated and serve to lift it to the open top of the chamber 14 where it is discharged. These agitating and lifting elements are carried by a vertically-arranged shaft 15 which is journaled in suitable bearings 16 and which is driven in any suitable way as by means of a driving pulley 17. The agitating and lifting elements are indicated at 18 and they are in the nature of arms radiating from the shaft 15 and are triangular in cross-sectional shape, each member 18 having the tapering or inclined sides 19. These members 18 are arranged on the shaft 15 in different angular positions so that when looked at in an axial direction they radiate from the shaft like the spokes of a wheel.

Secured to the lower end of the shaft 15 is a collar 20 having a plurality of agitating pins 21 depending therefrom, said pins being of such a length as to extend into the body of mercury 4. The metal-bearing ore which is delivered to the feed conduit 5 is forced positively by the screw conveyer 6 into the inlet opening 2 and is pushed through the body of mercury 4, during which operation the gold, silver and other precious metals become amalgamated with the mercury. As the ore emerges from the body of mercury, it is acted upon and agitated by the agitating pins 21. The purpose of these agitating pins is to keep the ore stirred up as it is delivered from the mercury thereby to prevent the mercury from being carried off with the waste dirt or tailings. As the waste dirt or tailings passes out through the discharge opening 3 it is acted upon by the agitating and lifting elements 18 which because of their inclined sides tend to lift or force the dirt upwardly. These elements 18 act something like conveyers to help carry the waste dirt or tailings from the outlet 3 to the top of the chamber 14. Situated above the open end of the chamber 14 is a sweeper which operates to throw the waste dirt or tailings over the top of the chamber 14. This sweeper is in the form of a plate 22 fast on the shaft 15 and provided on its under side with spiral radially-extending blades or fins 23. As the waste dirt or tailings reaches the top of the chamber 14 the blades or fins 23 act on it to force it radially over the edge. This waste dirt or tailings can be disposed of in any appropriate way. I have herein shown the amalgamating chamber and the chamber 14 as contained within a housing or casing 24 which is provided in its bottom with an opening 25 leading to a discharge passage 26 in which operates a screw conveyer 27. The waste dirt or tailings which are discharged from the chamber 4 will fall into the passage 26 through the opening 25 and the conveyer 27 will force them out through the delivery end 28 of said passage. The screw conveyer 27 may be operated in any suitable way. I have herein shown the shaft 29 of said conveyer as having a driving pulley 30 thereon by which it may be operated. I have also shown an arrangement by which the conveyer 6 may be operated in unison with the conveyer 27, although this arrangement is not essential to the invention. The shaft 29 of the conveyer 27 is shown as having a bevel gear 31 thereon which meshes with a bevel gear 32 on a shaft 33. Said shaft 33 has at its upper end a bevel gear 34 which meshes with and drives a bevel gear 35 on the shaft 8 of the conveyer 6. With this construction the conveyers 6 and 27 will be driven from the same driving pulley 30. The amalgamating chamber 1 has an opening 36 in its bottom which communicates through a suitable valve 37 with a discharge tube 38 that leads to the clean-up tub, tank or other receptacle.

The valve 37 may have any suitable construction which will hold the mercury and prevent leakage of the same. I have herein shown a valve of the type having a rotatable plug 39 provided with a port 40 which can be brought into communication with the opening 36 and discharge tube 38 by turning the plug through 90°. The plug is provided with a handle 41 which extends through the side of the housing 24, thus making the plug accessible from outside the housing.

My improved method and the operation of the machine will be readily understood from the foregoing. The ore is delivered to the passage 5 through the hopper 7 and is forced by the conveyer 6 into the opening 2 of the amalgamating chamber and through the mercury 4 therein. Since every particle of ore must necessarily pass through the body mercury, all the gold, silver and other precious metals will necessarily be brought into contact with the mercury and will thereby become amalgamated therewith so that the ore which is discharged from the body of mercury will be entirely free from precious metal. As the waste dirt or refuse rises from the body of mercury at the discharge opening 3, it is acted upon by the agitating pins 21 with the result that any mercury which tends to be carried away with the waste dirt or refuse will be loosened therefrom and allowed to fall back into the amalgamating chamber. The waste dirt thus freed from the mercury and other precious metal is forced up through the chamber 14 by the agitating and lifting elements 18 and is discharged over the top of the chamber 14 by the sweeper 22, said refuse being then delivered from the machine by the conveyer 27. The apparatus is simple and easy to operate and is effective in removing all precious metal from the ore.

The device will operate equally well on the ore whether it is in a wet or a dry state, and hence the device can be advantageously used in locations where no water is available.

The device also has the advantage that it will effectively remove all precious metal from the ore even though the ore is rapidly passed therethrough, this being because all the ore is compelled to pass through the body of mercury. For this reason the device has special advantages for use on low grade ores.

I claim:

1. In an apparatus of the class described, a substantially U-shaped receptacle, the base portion thereof forming an unobstructed mercury containing amalgamating chamber, one arm of the receptacle forming a feed pipe in unobstructed communication with said chamber and the other arm having an open top and of progressively increasing diameter from its lower to its upper end, mechanical means located entirely within the feed pipe and having its free end above the level of the mercury in the amalgamating chamber, adapted to force dry material through said amalgamating chamber and into the other arm, means operating within said last mentioned arm terminating above the level of the liquid in the amalgamating chamber for forcing the material upwardly through said last mentioned arm.

2. In an apparatus of the class described, a substantially U-shaped receptacle, the base portion thereof forming an unobstructed mercury containing amalgamated chamber, one arm of the receptacle forming a feed pipe in unobstructed communication with said chamber and the other arm having an open top and of progressively increasing diameter from its lower to its upper end, mechanical means located entirely in the feed pipe and having its free end above the level of the mercury in the amalgamating chamber to force dry material through said amalgamating chamber, a vertical shaft extending axially of the open-topped arm and terminating above the level of the amalgamating liquid in the amalgamating chamber, agitating pins depending from the lower end of said shaft and extending into the amalgamating chamber, and lifting and agitating members on the said shaft situated within the open-topped arm for mechanically forcing the material upwardly through said arm and a sweeper on said shaft above said last mentioned arm.

In testimony whereof I have signed my name to this specification.

LOUIS F. CONANT.

Copies of this patent may be obtained for five cents each, by addressing the "Commissioner of Patents, Washington, D. C."